United States Patent [19]

Bane

[11] Patent Number: 4,642,970
[45] Date of Patent: Feb. 17, 1987

[54] REUSABLE INSULATED BOX AND METHOD OF MANUFACTURE

[76] Inventor: William Bane, 1303 Del. Ave., Wilmington, Del. 19806

[21] Appl. No.: 815,937

[22] Filed: Jan. 3, 1985

Related U.S. Application Data

[62] Division of Ser. No. 664,883, Oct. 25, 1984, abandoned.

[51] Int. Cl.$^4$ .............................................. B65B 31/02
[52] U.S. Cl. ........................................ 53/433; 53/435; 53/442; 83/581
[58] Field of Search ................... 206/542; 53/433, 435, 53/441, 442, 556, 557; 83/581, 556

[56] References Cited

U.S. PATENT DOCUMENTS

| | | | |
|---|---|---|---|
| 2,808,192 | 10/1957 | Raisin | 493/110 X |
| 3,251,382 | 5/1966 | Tatsch | 52/63 X |
| 3,420,022 | 1/1969 | Brock | 52/750 X |
| 3,786,710 | 1/1974 | Backlin | 83/581 X |
| 3,890,762 | 6/1975 | Ernst et al. | 53/449 X |
| 3,958,391 | 5/1976 | Kujubu | 53/442 X |
| 4,282,973 | 8/1981 | Binkowski | 206/444 |

OTHER PUBLICATIONS

E. I. DuPont de Nemours & Co. (Inc.), Instrument Products Division, Shipping Container, Insulated, Small, drawing No. 709289.

*Primary Examiner*—James F. Coan
*Attorney, Agent, or Firm*—Shlesinger, Arkwright, Garvey & Fado

[57] ABSTRACT

A reusable insulated box includes a shipping container having a plurality of interconnected sides integral with a closed bottom and a sealable top. Bottom, top and side insert members are comprised of a rigid insulating material having at least an inner or outer surface thereof coated with a reflective insulating material for thereby providing a plurality of insulating plate members and each of the insulating plate members is sheathed in a heat shrunk thermoplastic insulating material. The bottom insert member is disposed in facial relation with the closed bottom of the container and the side insert members extend upwardly from a peripheral portion thereof in facial relation with the sides of the container. A top insert member is engaged with and supported by an upper surface of each of the side insert members and the combination of the thickness of the top and bottom insert members with the height of the side insert members is sufficient to permit closing and sealing of the sealable top.

7 Claims, 4 Drawing Figures

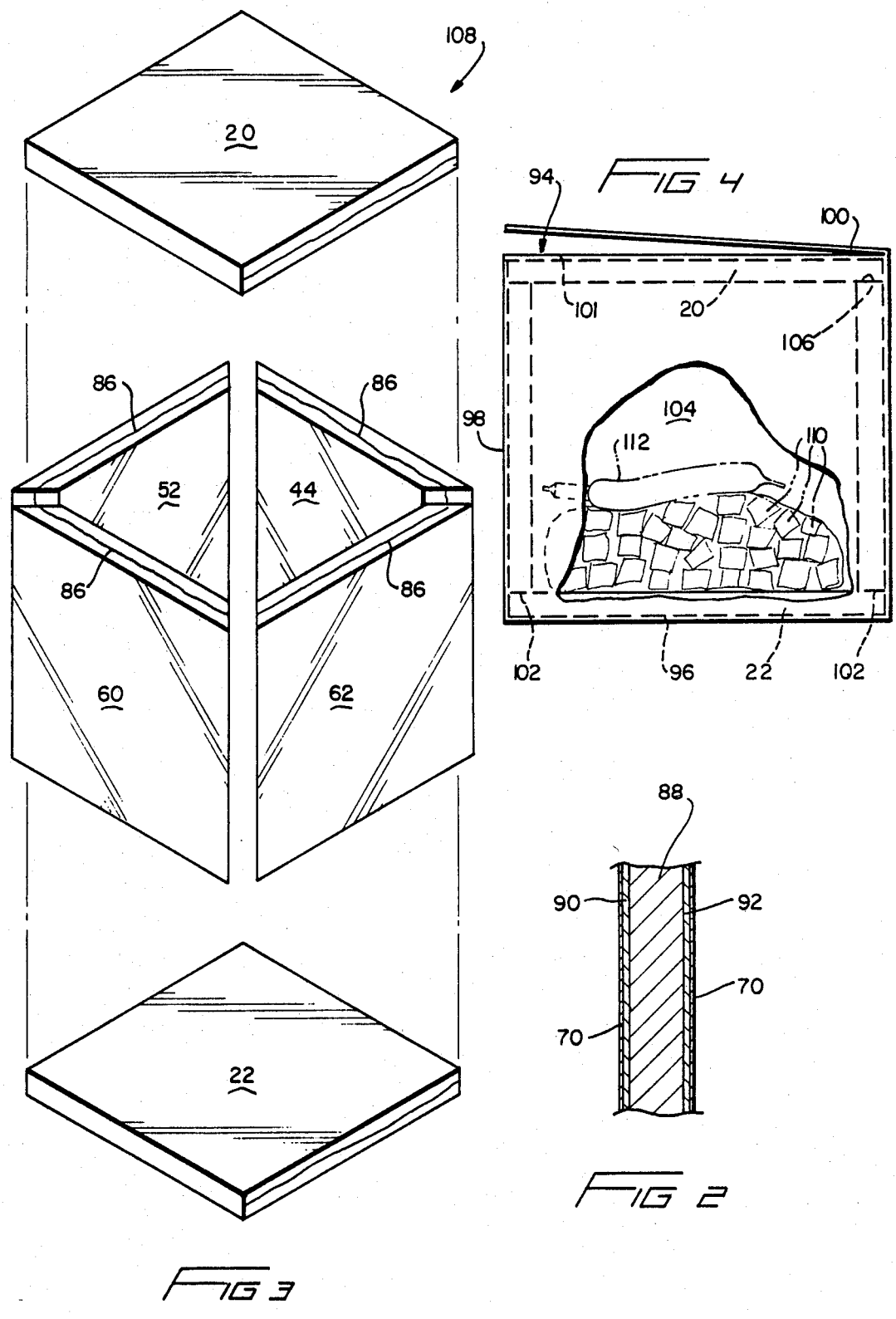

REUSABLE INSULATED BOX AND METHOD OF MANUFACTURE

This is a division of application Ser. No. 664,833, filed Oct. 25, 1984, and now abandoned.

BACKGROUND OF THE INVENTION

The shipment of relatively small quantities of refrigerated or cooled materials is frequently required in the course of medical and scientific research. The quantity of material which must be shipped may be of such small size that delivery by express or courier service is feasible and cost effective so long as the material remains chilled. Conventional shipping containers do not, unfortunately, provide adequate thermal insulation for maintaining the materials cooled. Furthermore, the quantity of material being shipped is so slight that conventional refrigerated shipping units are unfeasible.

Medical and scientific research may require that material which is sensitive to temperature fluctuations be transmitted between two distant locations. This is a typical situation in such diverse areas as organ transplants and biotechnology. Shipment of these materials requires that they be maintained at a chilled temperature throughout the shipping period or else suffer the possibility of severe degradation.

The materials being shipped must also be protected from violent impacts and rough handling. Consequently, the container in which the material is shipped must have substantial structural integrity. Additionally, the container in which the material is shipped must be capable of withstanding point impacts of substantial force.

Ernst, et al, U.S. Pat. No. 3,890,762, discloses a produce shipping container and packing method. That patent discloses the use of a carton liner which is manufactured from polystyrene foam having a particular density. The foam is cut into portions which provide the top, bottom and sides for the liner. The sides have straight edges which bear one against the other.

Tatsch, U.S. Pat. No. 3,251,382, discloses a foldable conduit structure comprised of a plurality of interconnected rigid plastic foam panels. At least some of the panels have beveled edges to permit the panels to be folded into a rectangular configuration. The foam panels have a non-perforated metal structural skin bonded to one side thereof.

Brock, U.S. Pat. No. 3,420,022, discloses a concrete insulation blanket. A portable blanket has a water impervious elongated plastic film cover. The plastic film cover surrounds at least one sheet of flexible material.

None of these patents, either alone or in combination, solves the problem of providing a reusable insulated box permitting refrigerated materials to be shipped long distances, without the need of external refrigeration, while maintaining the materials chilled. None of the patents discloses a reusable insulated box which is capable of withstanding rough handling by the shipper. None of the patents discloses an insulated box which includes integral means for maintaining dimensional and structural stability of the box. Finally, none of those patents disclose the utilization of heat shrinkable materials for sheathing the insulation plates of which the box is manufactured in order to greatly improve the resistance to temperature changes. The use of heat shrinkable polyvinyl chloride film not only improves the temperature resistance of the box components but also permits the components to be cleaned after use.

OBJECTS AND SUMMARY OF THE INVENTION

The primary object of the disclosed invention is to provide a reusable insulated box which is uniquely adapted for permitting chilled materials to be transported over extended time periods without the need for elaborate external refrigeration systems.

A further object of the disclosed invention is to provide a reusable insulated box which is nestled in a conventional shipping container.

Another object of the disclosed invention is to provide a reusable insulated box which is manufactured from a plurality of rigid foam panels having at least one surface thereof coated with a reflective material and wherein the panels are sheathed in an insulating film to thereby provide an R-factor of at least 14.

Yet another object of the disclosed invention is to provide an insulated box which is dimensionally and structurally stable when assembled in its shipping container.

Still yet another object of the disclosed invention is to provide an insulated box comprised of a plurality of side insert members which have mitred edges in order to maintain the side insert members in facial relation with the sides of the shipping container.

Yet a further of the disclosed invention is to provide an insulated box wherein the seams of the insulating film cooperate with the mitred edges in order to lock the side insert members into position.

Yet an additional object of the disclosed invention is to provide a method for manufacturing the components of the box from a single sheet of insulating material.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 2 is a fragmentary cross-sectional view through one of the components of the box;

FIG. 3 is an exploded perspective view disclosing the assembly of the box components; and, FIG. 4 is a side elevational view with portions broken away showing the box and the shipping container in the sealed configuration and disclosing the box partially filled with ice and a material which is being shipped.

DESCRIPTION OF THE INVENTION

Figure 1:
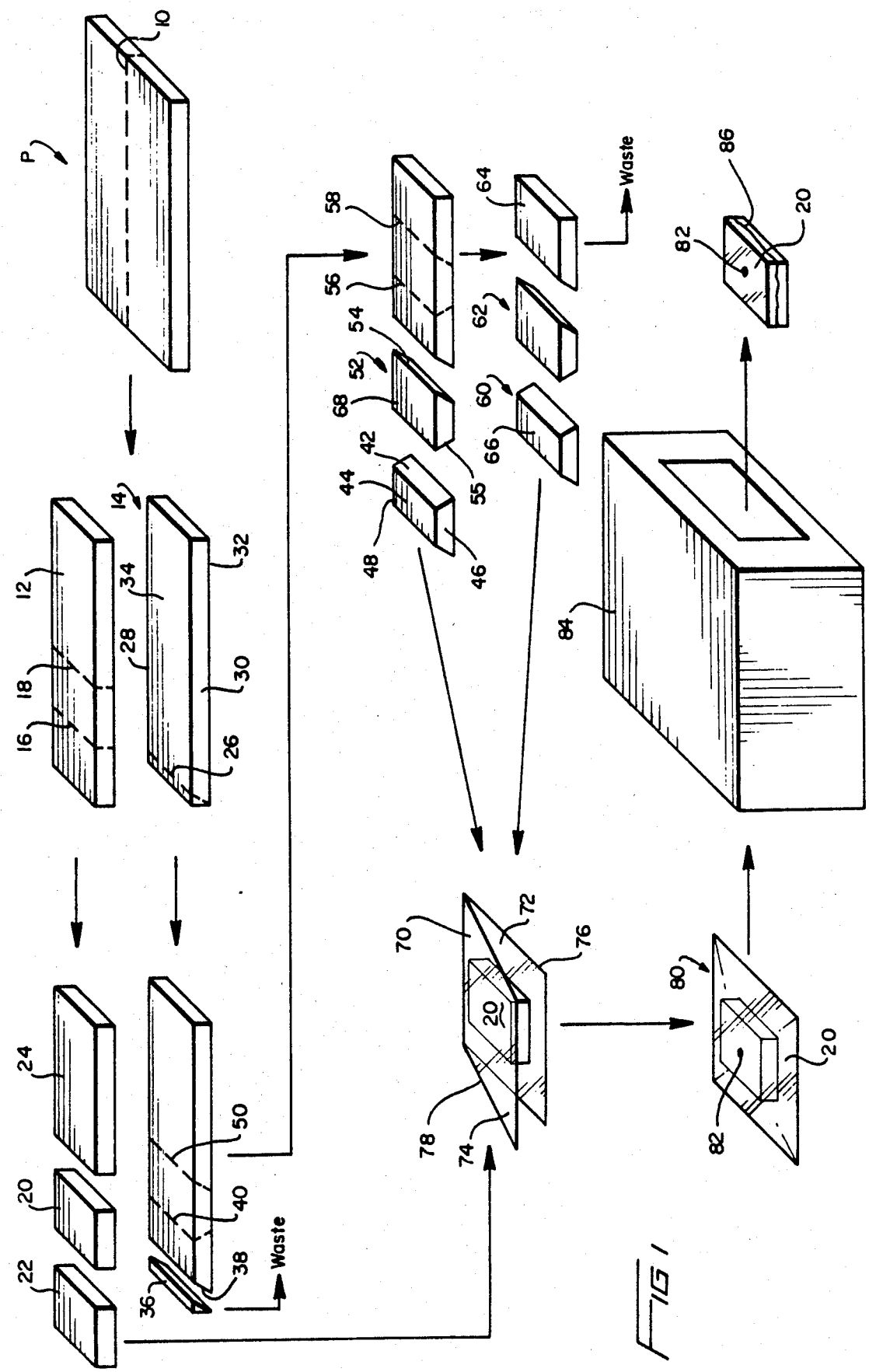
FIG. 1 is a schematic assembly drawing illustrating the method of manufacturing the components of the insulated box of the invention.

As best shown in FIG. 1, foam insulation plate P is generally of rectangular configuration and has a thickness of between about 0.5 inches to about 2.0 inches. The plate P is, preferably, comprised of a diisocyanate foam composition, such as polyurethane. diisocyanate foams are preferred due to their structural rigidity and their superior insulation properties. However, those skilled in the art appreciate that various other foams, such as polystyrene, may be adapted to provide the requisite properties.

Plate P is sliced along cutline 10 which thereby divides plate P into a pair of panel portions 12 and 14. Preferably, cutline 10 is equidistant the lateral side edges of plate P so that the plate portions 12 and 14 have substantially equal width. It is preferred that the plate P be sliced along line 10, rather than sawed or cut, in order to prevent the evolution of fine particulates which may create a disposal or health problem.

Panel portion 12 is sliced along cutlines 16 and 18 and thereby provides a top 20 and a bottom 22. Preferably, top 20 and bottom 22 are both square in configuration although the top and the bottom can have any configuration but should, preferably, be of equal size. The remaining portion 24 of portion 12 may be utilized for other purposes, such as providing additional tops 20 and bottoms 22.

Portion 14 is sliced along cutline 26 which is disposed at an angle to the lateral edges 28 and 30 thereof. Cutline 26 extends from lower surface 32 towards upper surface 34 and results in the production of a fall-off portion 36. Fall-off portion 36 represents waste and may be disposed of.

Cutline 26 produces a first mitred edge 38 for the remaining portion of portion 14. Preferably, mitred edge 38 is disposed at an angle of about 45° to lower surface 32 and upper surface 34 when the top 20 and the bottom 22 are square in shape. Those skilled in the art realize that mitred edge 38 will be disposed at an angle to lower surface 32 and upper surface 34 which is dictated by the overall configuration of the insulated box.

The remaining portion of portion 14 is sliced along cutline 40 and provides a mitred edge 42 for first side insert member 44. Mitred edge 42 is disposed at a second angle to surfaces 32 and 34 which is complementary to the first angle provided by cutline 26. In this way, the first side insert 44 has a first mitred edge 38 and a second mitred edge 42 and substantially flat top and bottom edges 46 and 48 which are generally transverse to surfaces 32 and 34.

The remaining portion of panel portion 14 is sliced along cutline 50 and provides a second side insert 52. Cutline 50 is disposed at an angle substantially the same as the first angle provided by cutline 26 and thereby provides a mitred edge 54 which is disposed parallel to mitred edge 38. It can be noted that cutline 40 also provides a mitred edge 55 for second side insert member 52 and that mitred edge 55 is disposed at an angle which is complementary of the angle which defines mitred edge 54.

The remaining portion of panel portion 14 is further sliced along cutlines 56 and 58. Cutlines 56 and 58 are, respectively, disposed at angles corresponding to the angles of cutlines 40 and 50. Consequently, cutlines 56 and 58 provide a third side insert member 60 and a fourth side insert member 62. The side insert members 52, 60 and 62 are all similar in configuration, and preferably in size, to first insert member 44 and each of the insert members 44, 52, 60 and 62 has corresponding mitred side edges, for reasons to be explained herein later. Production of third and fourth inserts 60 and 62, respectively, produces a fall-off portion 64 which is waste.

It can be noted that each of the first, second, third and fourth side insert portions, 44, 52, 60 and 62, respectively, has a top surface 66 which has a length less than the length of bottom surface 68. Consequently, each of the side insert members 44, 52, 60 and 62 resembles a truncated triangle when viewed in side elevation. Although the top surfaces 66 of each of the side inserts 44, 52, 60 and 62 and the bottom surfaces 68 thereof are shown as being equal, those skilled in the art can appreciate that the length of the top surfaces 66 and the bottom surfaces 68, respectively, will depend upon the configuration and shape of the box which is to be assembled.

The top 20, the bottom 22, and the side insert portions 44, 52, 60 and 62 are next wrapped with a heat shrinkable thermoplastic insulating film 70. The film 70 is, preferably, a polyvinyl chloride film and has a thickness of from about 0.5 mils to approximately 1.5 mils when in the unshrunk state. Suitable film 70 may be purchased from DuPont under their tradename Clysar or from W. R. Grace under their tradename Kraovak.

The film 70 is wrapped over the upper and lower surface of each of top 20, bottom 22 and side inserts 44, 52, 60 and 62 so that a first portion 72 is overlayed and contiguous with a second portion 74. It can be noted that each of portions 72 and 74 has a continuous edge which is disposed a substantial distance from the respective edges of the associated top 20, bottom 22, and inserts 44, 52, 60 and 62. The thermoplastic film 70 is of a type wherein the film 70 shrinks upon being heated to an elevated temperature. Consequently, the peripheral edges 76 and 78, respectively, of the portions 72 and 74 are disposed a predetermined distance from the associated edges and sides, for reasons to be explained herein.

The edges 76 and 78 of the portions 72 and 74 are next sealed, preferably by heat sealing, and thereby encase each of the associated top 20, bottom 22 and inserts 44, 52, 60 and 62 in a thermoplastic envelope 80. An anti-blister opening 82 is provided in each of the envelopes 80 in order to prevent air or other gases from becoming trapped in the envelopes 80 during the heating and shrinking steps. Preferably, an anti-blister opening 82 is disposed adjacent the top and bottom surface of each of top 20, bottom 22, and side inserts 44, 52, 60 and 62.

Each of the envelopes 80, with their encased top 20, bottom 22, and side inserts 44, 52, 60 and 62 are then heated in oven 84 to a temperature sufficient to cause the film 70 of the envelopes 80 to shrink and to thereby tightly sheath the associated top 20, bottom 22, and side inserts 44, 52, 60 and 62. It can be noted that the envelope 80 has tightly sheathed or encased the top 20 and that a seam 86 runs along the edges thereof substantially equidistant the top and bottom surfaces.

As best shown in FIG. 2, diisocyanate core 88 is sandwiched between inner reflective layer 90 and outer reflective layer 92. Preferably, the reflective layers 90 and 92 are comprised of an aluminized coating which is bonded to the core 88. Preferably, the core 88 is foamed in situ between the layers 90 and 92 for thereby providing excellent bonding therewith. Consequently, the sandwiched core 88 provides an insulating plate. Therefore, each of the top 20, bottom 22 and inserts 44, 52, 60 and 62 also provides an insulating plate. FIG. 2 also discloses the thermoplastic film 70 which is outwardly disposed relative to layers 90 and 92. It can be noted that the film 70 is in substantially continuous engagement with the coatings 90 and 92 and thereby sheaths the insulating plates.

The use of polyvinyl chloride film 70 in conjunction with the aluminized coatings 90 and 92 and the core 88 is preferred because the juxtaposition thereof provides a panel having an R-value of at least 14 and preferably 16 or above. Naturally, the R-value, or resistance to heat transfer, is a function of the thickness of the core 88. The polyvinyl chloride film 70, however, greatly increases the R-value of the core 88. The reflective layers 90 and 92 also enhance the thermal resistance of the panels obtained. Consequently, the sheathing of the core 88 and the layers 90 and 92 between the film 70 provides a panel of very high thermal resistance and one which has excellent dimensional and structural stability.

As best shown in FIG. 4, a conventional corrugated shipping container 94 has a closed bottom 96 and interconnected sides 98 integral therewith and with sealable top portions 100 and 101. Preferably, top portions 100 and 101 include glue or other means for sealing the portions 101 and 100 together to thereby close the carton 94. Bottom insert member 22 is placed into container 94 and is disposed in facial relation with closed bottom 96. Bottom insert 22 has the shape and dimensions of the interior of closed bottom 96 and therefore snuggly rests in carton 94. Side insert members 44, 52, 60 and 62 are then positioned in container 94 such that the lower surface 102 of each of inserts 44, 52, 60 and 62 is engaged with the periphery of bottom insert 22 and extends upwardly therefrom. The side inserts 44, 52, 60 and 62 are disposed in facial relation with the sides 98 of container 94 such that the mitred edges are in abutting relation and so that the bottom surfaces 68 thereof are contiguously engaged with the inner surfaces of the sides 98. It can be appreciated that the bottom surfaces 68 now provide an outer surface while the upper surfaces 66 provide an inner surface. In this way, the side inserts 44, 52, 60 and 62 in cooperation with the bottom insert 22 provide a space 104 which is to be filled.

Preferably, the side inserts 44, 52, 60 and 62 have a uniform height such that the upper surface 106 thereof is disposed below the top of the sides 98. Top insert member 20 is positioned into engagement with the upper surfaces 106 of each of the inserts 44, 52, 60 and 62 and is supported thereby and closes the space 104, preferably after the space 104 has been filled with the material to be transmitted. Consequently the insert members 20, 22, 44, 52, 60 and 62 define a bounded space. Preferably, top insert member 20 and bottom insert member 22 have a uniform thickness which plus the height of the side inserts 44, 52, 60 and 62 is equal to the internal height of the sides 98 in order to permit the top portions 100 and 101 to close the container 94. Preferably, the side insert members 44, 52, 60 and 62 have a uniform thickness which is equal to the thickness of the top insert member 20 and the bottom insert member 22.

The assembly configuration of the insulated box 108 of the invention is best shown in FIG. 3. The bottom insert member 22 is positioned in the carton 94 and the side insert members 44, 52, 60 and 62 are then engaged therewith causing the abutting mitred edges thereof to prevent the side inserts 44, 52, 60 and 62 from shifting or otherwise changing orientation. It can be noted in FIG. 3 that the seam 86 of each of the envelopes 80 extends along the mitred edges of each of the inserts 44, 52, 60 and 62 and also along either the top surface 106 or the bottom surface 102 thereof. It is preferred that the seam 86 extend along the mitred edges so that the seams 86 and the abutting mitred edges cooperate to lock the inserts 44, 52, 60 and 62 in position in the container 94. The seams 86 extend a slight distance outwardly from the film 70 with the result that the abutting seams 86 bear one against the other and against the mitred edges and help to maintain the inserts 44, 52, 60 and 62 in position in the container 94. In this way, the thermoplastic film 70 not only increases the overall R-value of the insulating panel portions obtained by heat shrinking the film 70 about the top 20, bottom 22 and side inserts 44, 52, 60 and 62 but also serves the important function of increasing the structural stability of the insulated box 108 when positioned in the shipping container 94.

As best shown in FIG. 4, cubes of ice 110, or other suitable refrigerated material, is positioned in space 104. Container 112, which holds the material to be shipped, is positioned into engagement with cubes 110 in order to maintain the material (not shown) in the container 112 at a chilled temperature. The insulating panel members provided by the sheathed top 20, bottom 22, and side inserts 44, 52, 60 and 62 are uniquely adapted for preventing heat from being transferred into the spaced to be filled 104. The thermal resistance prevents the cubes 110 from melting. Consequently, the insulating properties provided by the sheathing of the top 20, bottom 22 and side inserts 44, 52, 60 and 62 with the film 70 permits the contents of the container 112 to be in transit for a substantial period of time before the cubes 110 melt. Consequently, the contents of the container 112 will not spoil or otherwise degrade during this shipment time.

Those skilled in the art can appreciate that the R-value of the sheathed top 20, bottom 22 and side inserts 44, 52, 60 and 62 is related to the thickness of the core 88. Consequently, the thickness of the core 88 is chosen with knowledge of the transit time and the temperature beyond which the contents of the container 112 can not be subjected to.

A particularly advantageous feature of the utilization of the film 70 is that the film 70 may be cleaned after use to thereby permit the box 108 to be reused. Additionally, the top 20, bottom 22 and side inserts 44, 52, 60 and 62 may be individually interchanged in the event that one of them becomes damaged or otherwise becomes unsatisfactory. Also, the top 20, bottom 22 and side inserts 44, 52, 60 and 62 may be shipped to the individual having need of the box 108 without the container 94 and they may be shipped flat because the plate P is of planar configuration. Consequently, the user of the box 108 can order the top 20, bottom 22 and side inserts 44, 52, 60 and 62 as needed and as required for the container 94 which is being utilized.

While this invention has been described as having a preferred design, it is understood that it is capable of further modifications, uses and/or adoptations of the invention following in general the principal of the invention and including such departures from the present disclosure as come within known or customary practice in the art to which the invention pertains, and as may be applied to the central features hereinbefore set forth, and fall within the scope of the invention of the limits of the appended claims.

What I claim is:

1. A process for manufacturing a reusable insulated box, comprising the steps of:
   (a) providing a rectangular foam panel having one surface thereof coated with a reflective material;
   (b) slicing said panel into first and second portions;
   (c) slicing said first portion into a top and a bottom for the box, said top and bottom having corresponding configuration and dimension;
   (d) slicing said second portion into a plurality of sides for the box, said second portion being sliced at an angle to said material for providing oppositely disposed mitred complementary edges for each of said sides;

(e) wrapping each of said top, bottom and sides in a heat shrinkable thermoplastic film;

(f) sealing the edges of said film and thereby encapsulating each of said top, bottom and sides in a film envelope;

(g) piercing the film adjacent the major surfaces of each of said top, bottom and sides and thereby providing each envelope with a pair of anti-blister openings; and, (h) heating each of said envelopes to a temperature sufficient to cause the film to shrink so that entrapped air vents through said anti-blister openings during shrinking and thereby permits the thermoplastic film to tightly sheath the top, bottom and sides and thereby provide top, bottom and side insert members for the box.

2. The process as defined in claim 1, including the steps of:

(a) wrapping each of said top, bottom and sides with a sheath of shrinkable film which is folded on a line parallel to an edge of the associated top, bottom and sides so that said film has a first portion overlying and contiguous a second portion and said first and second portions have a continuous edge disposed a substantial distance from the edges of the associated top, bottom and sides.

3. The process as defined in claim 1, including the further steps of:

(a) providing a shipping carton having a plurality of interconnected sides integral with a closed bottom and a sealable top;

(b) placing said bottom insert member in facial relation with said closed bottom;

(c) placing each of said side insert members in engagement with a peripheral portion of said bottom insert member and in facial relation with one of said sides so that the outer surface of each of said side insert members is engaged with a side of the box and thereby providing a spaced to be filled;

(d) engaging and thereby supporting said top insert member with an upper surface of said side insert members for thereby enclosing said spaced to be filled; and, (e) closing and sealing said top.

4. The process as defined in claim 3, including the step of:

(a) placing into the space to be filled a supply of refrigerated material prior to placing said top insert member into engagement with said upper surfaces.

5. A process for sheathing an insulating panel, comprising the steps of:

(a) providing a foam insulating panel of rectangular configuration having at least one surface thereof coated with a reflective material;

(b) providing a sheet of heat shrinkable thermoplastic film;

(c) placing said panel on a first portion of said film and folding said sheet so that a second portion thereof overlies said panel and so that said portions have contiguous edges;

(d) sealing said edges together;

(e) piercing said portions and thereby providing anti-blister openings in said film; and, (f) shrinking said film while allowing air to vent through said openings and thereby sheathing said panel.

6. The process of claim 5, including the step of:

(a) heating said film to a temperature sufficient to cause said film to shrink.

7. The process of claim 5, including the step of:

(a) heating said film in an oven to a temperature sufficient to cause said film to shrink and thereby sheathing said panel.

* * * * *

REEXAMINATION CERTIFICATE (1292nd)

United States Patent [19]

Bane

[11] B1 4,642,970

[45] Certificate Issued May 29, 1990

[54] REUSABLE INSULATED BOX AND METHOD OF MANUFACTURE

[76] Inventor: William Bane, 1303 Del. Ave., Wilmington, Del. 19806

Reexamination Request:
No. 90/001,436, Feb. 12, 1988

Reexamination Certificate for:
Patent No.: 4,642,970
Issued: Feb. 17, 1987
Appl. No.: 815,937
Filed: Jan. 3, 1985

[51] Int. Cl.⁵ ............................................. B65B 31/02
[52] U.S. Cl. ....................................... 53/433; 53/435; 53/442; 83/581
[58] Field of Search ................. 53/433, 435, 441, 442, 53/556, 557; 83/581, 556; 206/542

[56] References Cited

U.S. PATENT DOCUMENTS 2,545,243   3/1951   Rumsey, Jr. .......................... 18/56

OTHER PUBLICATIONS

E. I. Du Pont de Nemours & Co. (Inc.) Instrument Products Division, Shipping Container, Insulated, Small Drawing No. 709,289, Apr. 13, 1981.

*Primary Examiner*—James F. Coan

[57] ABSTRACT

A reusable insulated box includes a shipping container having a plurality of interconnected sides integral with a closed bottom and a sealable top. Bottom, top and side insert members are comprised of a rigid insulating material having at least an inner or outer surface thereof coated with a reflective insulating material for thereby providing a plurality of insulating plate members and each of the insulating plate members is sheathed in a heat shrunk thermoplastic insulating material. The bottom insert member is disposed in facial relation with the closed bottom of the container and the side insert members extend upwardly from a peripheral portion thereof in facial relation with the sides of the container. A top insert member is engaged with and supported by an upper surface of each of the side insert members and the combination of the thickness of the top and bottom insert members with the height of the side insert members is sufficient to permit closing and sealing of the sealable top.

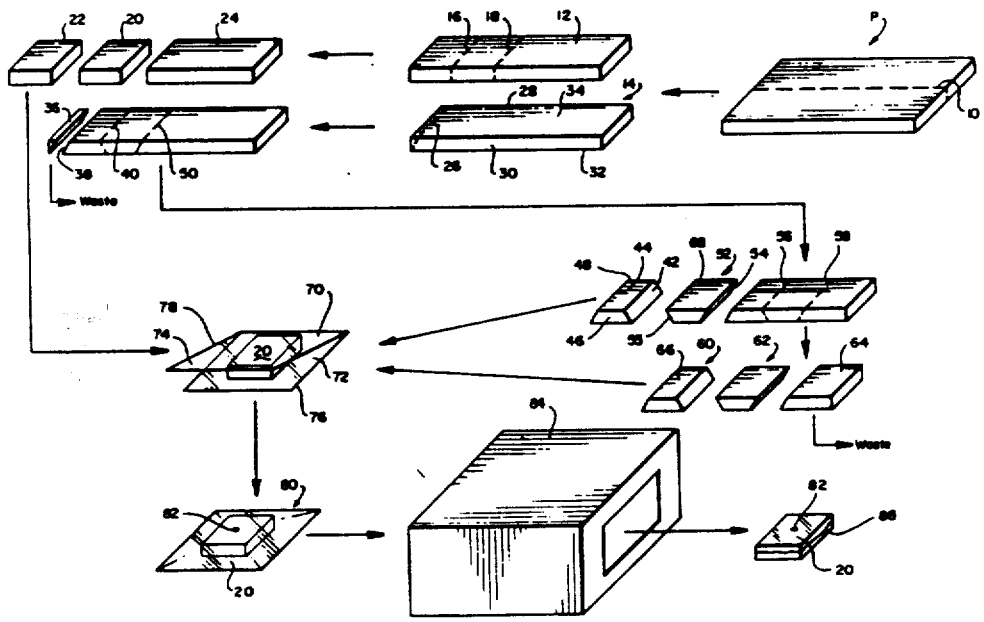

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-4 is confirmed.

Claims 5-7 are cancelled.

* * * * *